US011393179B2

(12) United States Patent  
Fleischman et al.

(10) Patent No.: US 11,393,179 B2  
(45) Date of Patent: Jul. 19, 2022

(54) RENDERING DEPTH-BASED THREE-DIMENSIONAL MODEL WITH INTEGRATED IMAGE FRAMES

(71) Applicant: Open Space Labs, Inc., San Francisco, CA (US)

(72) Inventors: Michael Ben Fleischman, Los Angeles, CA (US); Jeevan James Kalanithi, San Francisco, CA (US); Gabriel Hein, Albany, CA (US); Elliott St. George Wilson Kember, San Francisco, CA (US)

(73) Assignee: OPEN SPACE LABS, INC., San Francisco, CA (US)

( * ) Notice: Subject to any disclaimer, the term of this patent is extended or adjusted under 35 U.S.C. 154(b) by 0 days.

(21) Appl. No.: 17/367,204

(22) Filed: Jul. 2, 2021

(65) Prior Publication Data

US 2022/0114791 A1  Apr. 14, 2022

Related U.S. Application Data

(60) Provisional application No. 63/165,682, filed on Mar. 24, 2021, provisional application No. 63/090,095, filed on Oct. 9, 2020.

(51) Int. Cl.  
*G06T 19/00* (2011.01)  
*G06T 17/00* (2006.01)  
(Continued)

(52) U.S. Cl.  
CPC ............ *G06T 19/006* (2013.01); *G01S 17/86* (2020.01); *G01S 17/89* (2013.01);  
(Continued)

(58) Field of Classification Search  
CPC ... G06T 19/006; G06T 17/00; G06T 2200/24; G06T 2219/004; G01S 17/86;  
(Continued)

(56) References Cited

U.S. PATENT DOCUMENTS

2004/0109012 A1  6/2004  Kraus et al.  
2014/0125768 A1  5/2014  Bell et al.  
(Continued)

FOREIGN PATENT DOCUMENTS

WO    WO 2018/100394 A1    6/2018

OTHER PUBLICATIONS

PCT International Search Report and Written Opinion, PCT Application No. PCT/US21/51389, dated Dec. 16, 2021, 24 pages.

*Primary Examiner* — Chong Wu  
(74) *Attorney, Agent, or Firm* — Fenwick & West LLP

(57) ABSTRACT

A system aligns a 3D model of an environment with image frames of the environment and generates a visualization interface that displays a portion of the 3D model and a corresponding image frame. The system receives LIDAR data collected in the environment and generates a 3D model based on the LIDAR data. For each image frame, the system aligns the image frame with the 3D model. After aligning the image frames with the 3D model, when the system presents a portion of the 3D model in an interface, it also presents an image frame that corresponds to the portion of the 3D model.

20 Claims, 10 Drawing Sheets

(51) Int. Cl.
  *G06F 3/04815* (2022.01)
  *G06F 3/04845* (2022.01)
  *G01S 17/89* (2020.01)
  *G01S 17/86* (2020.01)
  *G06F 3/04842* (2022.01)

(52) U.S. Cl.
  CPC ...... *G06F 3/04815* (2013.01); *G06F 3/04842* (2013.01); *G06F 3/04845* (2013.01); *G06T 17/00* (2013.01); *G06F 2203/04806* (2013.01); *G06T 2200/24* (2013.01); *G06T 2219/004* (2013.01)

(58) Field of Classification Search
  CPC .. G01S 17/89; G06F 3/04815; G06F 3/04842; G06F 3/04845; G06F 2203/04806
  See application file for complete search history.

(56) References Cited

U.S. PATENT DOCUMENTS

| | | |
|---|---|---|
| 2015/0077444 A1 | 3/2015 | Chen et al. |
| 2016/0253839 A1 | 9/2016 | Cole et al. |
| 2018/0322197 A1* | 11/2018 | Hesterman .......... G06F 16/7335 |

\* cited by examiner

RENDERING DEPTH-BASED THREE-DIMENSIONAL MODEL WITH INTEGRATED IMAGE FRAMES

CROSS REFERENCE TO RELATED APPLICATIONS

This application claims the benefit of U.S. Provisional Application Ser. No. 63/090,095 filed Oct. 9, 2020, and U.S. Provisional Application Ser. No. 63/165,682 filed Mar. 24, 2021, each of which are incorporated in its entirety herein by this reference.

TECHNICAL FIELD

This disclosure relates to generating models of an environment, and particularly to aligning a three dimensional model of the environment generated based on depth information (such as light detection and ranging or LIDAR data) with image frames of the environment and presenting a portion of the three dimensional model with a corresponding image frame.

BACKGROUND

Images of an environment can be useful for reviewing details associated with the environment without having to visit the environment in person. For example, a realtor may wish to create a virtual tour of a house by capturing a series of photographs of the rooms in the house to allow interested parties to view the house virtually. Similarly, a contractor may wish to monitor progress on a construction site by capturing images of the construction site at various points during constructions and comparing images captured at different times. However, images are limited to two dimensions (2D), so a three dimensional (3D) model of the environment may be generated using a LIDAR system to provide additional details about the environment. When multiple representations of the environment are presented simultaneously, it can provide more useful insights about the environment compared to when the images and 3D model are considered separately. However, when there is a large volume of images and a separate 3D model, it can be difficult and time consuming to manually review the images and match images to corresponding portions of the 3D model.

SUMMARY

A spatial indexing system receives image frames captured in an environment and LIDAR data collected in the same environment and aligns a 3D model generated based on the LIDAR data with the image frames. The spatial indexing system aligns the 3D model with the image frames by mapping each image frame to a portion of the 3D model. In some embodiments, the images frames and the LIDAR data are captured at the same time by a mobile device as the mobile device is moved through the environment, and image frames are mapped to the LIDAR data based on timestamps. In some embodiments, the video capture system and the LIDAR system are separate systems, and the image frames are mapped to the 3D model based on feature vectors. After the alignment, the spatial indexing system generates an interface that presents a selected portion of the 3D model and an image frame that corresponds to the selected portion of the 3D model.

DETAILED DESCRIPTION

I. Overview

A spatial indexing system receives a video that includes a sequence of image frames depicting an environment and aligns the image frames with a 3D model of the environment generated using LIDAR data. The image frames are captured by a video capture system that is moved through environment along a path. The LIDAR data is collected by a LIDAR system, and the spatial indexing system generates the 3D model of the environment based on the LIDAR data received from the LIDAR system. The spatial indexing system aligns the images with the 3D model. In some embodiments, the LIDAR system is integrated with the video capture system such that the image frames and the LIDAR data are captured simultaneously and are time synchronized. Based on the time synchronization, the spatial indexing system may determine locations at which each of the image frames were captured and determine a portion of the 3D model that the image frame corresponds to. In other embodiments, the LIDAR system is a separate from the video capture system, and the spatial indexing system may use feature vectors associated with the LIDAR data and feature vectors associated with the image frames for alignment.

The spatial indexing system generates an interface with a first interface portion for displaying a 3D model and a second interface portion for displaying an image frame. The spatial indexing system may receive an interaction from a user indicating a portion of the 3D model to be displayed. For example, the interaction may include selecting a waypoint icon associated with a location within the 3D model or selecting an object in the 3D model. The spatial indexing system identifies an image frame that is associated with the selected portion of the 3D model and displays the corresponding image frame in the second interface portion. When the spatial indexing system receives another interaction indicating another portion of the 3D model to be displayed, the interface is updated to display the other portion of the 3D model in the first interface and display a different image frame associated with the other portion of the 3D model.

II. System Environment

Figure 1:
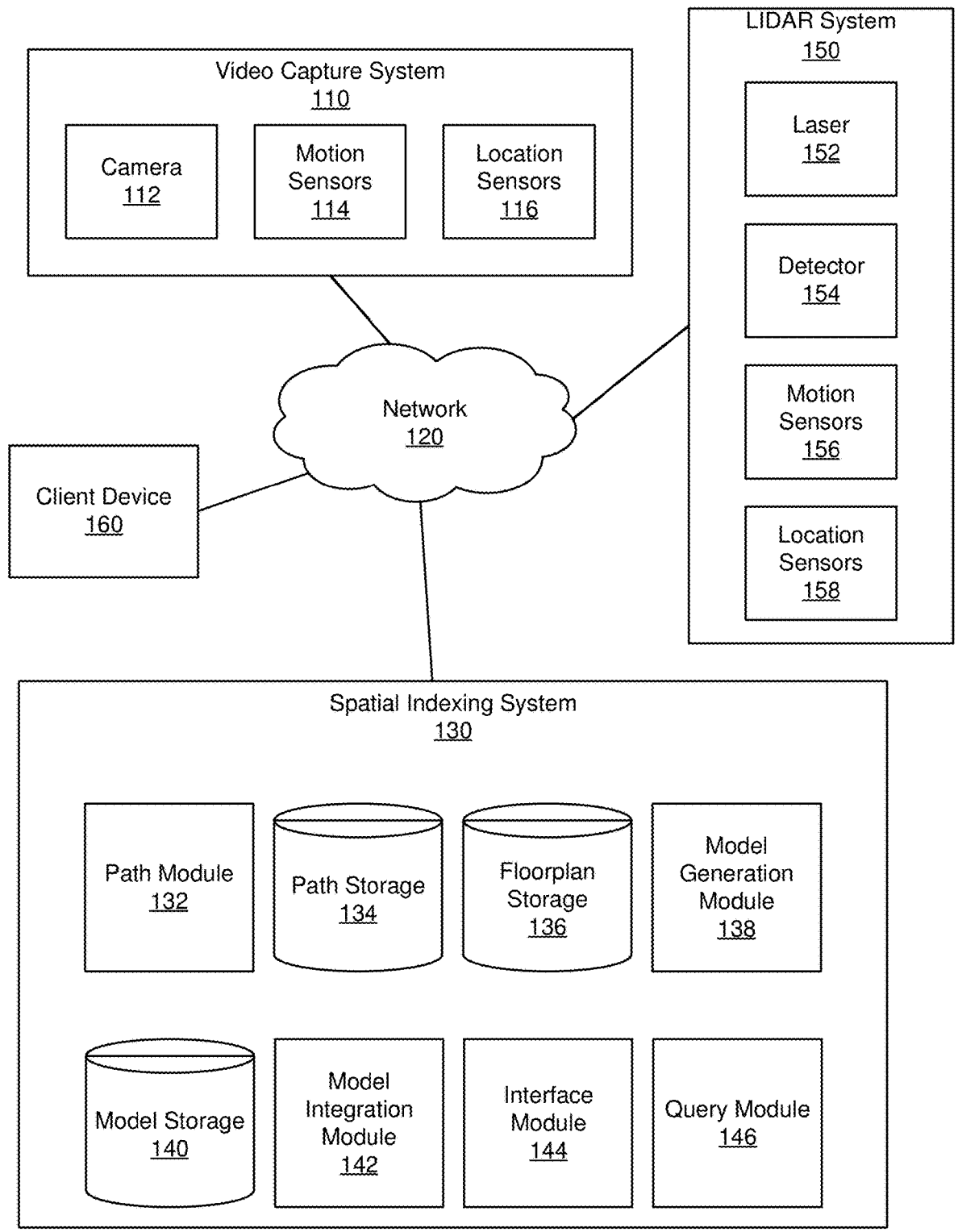
FIG. 1 illustrates a system environment for a spatial indexing system, according to one embodiment.

FIG. 1 illustrates a system environment 100 for a spatial indexing system, according to one embodiment. In the embodiment shown in FIG. 1, the system environment 100 includes a video capture system 110, a network 120, a spatial indexing system 130, a LIDAR system 150, and a client device 160. Although a single video capture system 110, a single LIDAR system 150, and a single client device 160 is shown in FIG. 1, in some implementations the spatial indexing system 130 interacts with multiple video capture systems 110, multiple LIDAR systems 150, and/or multiple client devices 160.

The video capture system 110 collects one or more of frame data, motion data, and location data as the video capture system 110 is moved along a path. In the embodiment shown in FIG. 1, the video capture system 110 includes a camera 112, motion sensors 114, and location sensors 116. The video capture system 110 is implemented as a device with a form factor that is suitable for being moved along the path. In one embodiment, the video capture system 110 is a portable device that a user physically moves along the path, such as a wheeled cart or a device that is mounted on or integrated into an object that is worn on the user's body (e.g., a backpack or hardhat). In another embodiment, the video capture system 110 is mounted on or integrated into a vehicle. The vehicle may be, for example, a wheeled vehicle (e.g., a wheeled robot) or an aircraft (e.g., a quadcopter drone), and can be configured to autonomously travel along a preconfigured route or be controlled by a human user in real-time. In some embodiments, the video capture system 110 is a part of a mobile computing device such as a smartphone, tablet computer, or laptop computer. The video capture system 110 may be carried by a user and used to capture a video as the user moves through the environment along the path.

The camera 112 collects videos including a sequence of image frames as the video capture system 110 is moved along the path. In some embodiments, the camera 112 is a 360-degree camera that captures 360-degree frames. The camera 112 can be implemented by arranging multiple non-360-degree cameras in the video capture system 110 so that they are pointed at varying angles relative to each other, and configuring the multiple non-360 cameras to capture frames of the environment from their respective angles at approximately the same time. The image frames can then be combined to form a single 360-degree frame. For example, the camera 112 can be implemented by capturing frames at substantially the same time from two 180° panoramic cameras that are pointed in opposite directions. In other embodiments, the camera 112 has a narrow field of view and is configured to capture typical 2D images instead of 360-degree frames.

The frame data captured by the video capture system 110 may further include frame timestamps. The frame timestamps are data corresponding to the time at which each frame was captured by the video capture system 110. As used herein, frames are captured at substantially the same time if they are captured within a threshold time interval of each other (e.g., within 1 second, within 100 milliseconds, etc.).

In one embodiment, the camera 112 captures a walkthrough video as the video capture system 110 is moved throughout the environment. The walkthrough video including a sequence of image frames that can be captured at any frame rate, such as a high frame rate (e.g., 60 frames per second) or a low frame rate (e.g., 1 frame per second). In general, capturing the sequence of image frames at a higher frame rate produces more robust results, while capturing the sequence of image frames at a lower frame rate allows for reduced data storage and transmission. In another embodiment, the camera 112 captures a sequence of still frames separated by fixed time intervals. In yet another embodiment, the camera 112 captures single image frames. The motion sensors 114 and location sensors 116 collect motion data and location data, respectively, while the camera 112 is capturing the frame data. The motion sensors 114 can include, for example, an accelerometer and a gyroscope. The motion sensors 114 can also include a magnetometer that measures a direction of a magnetic field surrounding the video capture system 110.

The location sensors 116 can include a receiver for a global navigation satellite system (e.g., a GPS receiver) that determines the latitude and longitude coordinates of the video capture system 110. In some embodiments, the location sensors 116 additionally or alternatively include a receiver for an indoor positioning system (IPS) that determines the position of the video capture system based on signals received from transmitters placed at known locations in the environment. For example, multiple radio frequency (RF) transmitters that transmit RF fingerprints are placed throughout the environment, and the location sensors 116 also include a receiver that detects RF fingerprints and estimates the location of the video capture system 110 within the environment based on the relative intensities of the RF fingerprints.

Although the video capture system 110 shown in FIG. 1 includes a camera 112, motion sensors 114, and location sensors 116, some of the components 112, 114, 116 may be omitted from the video capture system 110 in other embodiments. For instance, one or both of the motion sensors 114 and the location sensors 116 may be omitted from the video capture system.

In some embodiments, the video capture system 110 is implemented as part of a computing device (e.g., the computer system 600 shown in FIG. 6) that also includes a storage device to store the captured data and a communication interface that sends the captured data over the network 120 to the spatial indexing system 130. In one embodiment, the video capture system 110 stores the captured data locally as the video capture system 110 is moved along the path, and the data is sent to the spatial indexing system 130 after the data collection has been completed. In another embodiment, the video capture system 110 sends the captured data to the spatial indexing system 130 in real-time as the system 110 is being moved along the path.

The video capture system 110 communicates with other systems over the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). The network 120 may also be used to deliver push notifications through various push notification services, such as APPLE Push Notification Service (APNs) and GOOGLE Cloud Messaging (GCM). Data exchanged over the network 110 may be represented using any suitable format, such as hypertext markup language (HTML), extensible markup language (XML), or JavaScript object notation (JSON). In some embodiments, all or some of the communication links of the network 120 may be encrypted using any suitable technique or techniques.

The light detection and ranging (LIDAR) system 150 collects three dimensional data representing the environment using a laser 152 and a detector 154 as the LIDAR system 150 is moved throughout the environment. The laser 152 emits laser pulses, and the detector 154 detects when the laser pulses return to the LIDAR system 150 after being reflected by a plurality of points on objects or surfaces in the environment. The LIDAR system 150 also includes motion sensors 156 and location sensors 158 that indicates the motion and the position of the LIDAR system 150 which can be used to determine the direction in which the laser pulses are emitted. The LIDAR system 150 generates LIDAR data associated with detected laser pulses after being reflected off surfaces of the objects or surfaces in the environment. The LIDAR data may include a set of (x,y,z) coordinates determined based on known direction in which the laser pulses were emitted and duration of time between emission by the laser 152 and detection by the detector 154. The LIDAR data may also include other attribute data such as intensity of detected laser pulse. In other embodiments, the LIDAR system 150 may be replaced by another depth-sensing system. Examples of depth-sensing systems include radar systems, 3D camera systems, and the like.

In some embodiments, the LIDAR system 150 is integrated with the video capture system 110. For example, the LIDAR system 150 and the video capture system 110 may be components of a smartphone that is configured to capture videos and LIDAR data. The video capture system 110 and the LIDAR system 150 may be operated simultaneously such that the video capture system 110 captures the video of the environment while the LIDAR system 150 collects LIDAR data. When the video capture system 110 and the LIDAR system 150 are integrated, the motion sensors 114 may be the same as the motion sensors 156 and the location sensors 116 may be the same as the location sensors 158. The LIDAR system 150 and the video capture system 110 may be aligned, and points in the LIDAR data may be mapped to a pixel in the image frame that was captured at the same time as the points such that the points are associated with image data (e.g., RGB values). The LIDAR system 150 may also collect timestamps associated with points. Accordingly, image frames and LIDAR data may be associated with each other based on timestamps. As used herein, a timestamp for LIDAR data may correspond to a time at which a laser pulse was emitted toward point or a time at which the laser pulse was detected by the detector 154. That is, for a timestamp associated with an image frame indicating a time at which the image frame was captured, one or more points in the LIDAR data may be associated with the same timestamp. In some embodiments, the LIDAR system 150 may be used while the video capture system 110 is not being used, and vice versa. In some embodiments, the LIDAR system 150 is a separate system from the video capture system 110. In such embodiments, the path of the video capture system 110 may be different from the path of the LIDAR system 150.

The spatial indexing system 130 receives the image frames captured by the video capture system 110 and the LIDAR collected by the LIDAR system 150, performs a spatial indexing process to automatically identify the spatial locations at which each of the image frames and the LIDAR data were captured to align the image frames to a 3D model generated using the LIDAR data. After aligning the image frames to the 3D model, the spatial indexing system 130 provides a visualization interface that allows the client device 160 to select a portion of the 3D model to view along with a corresponding image frame side by side. In the embodiment shown in FIG. 1, the spatial indexing system 130 includes a path module 132, a path storage 134, a floorplan storage 136, a model generation module 138, a model storage 140, a model integration module 142, an interface module 144, and a query module 146. In other embodiments, the spatial indexing system 130 may include fewer, different, or additional modules.

The path module 132 receives the image frames in the walkthrough video and the other location and motion data that were collected by the video capture system 110 and determines the path of the video capture system 110 based on the received frames and data. In one embodiment, the path is defined as a 6D camera pose for each frame in the walkthrough video that includes a sequence of frames. The 6D camera pose for each frame is an estimate of the relative position and orientation of the camera 112 when the image frame was captured. The path module 132 can store the path in the path storage 134.

In one embodiment, the path module 132 uses a SLAM (simultaneous localization and mapping) algorithm to simultaneously (1) determine an estimate of the path by inferring the location and orientation of the camera 112 and (2) model the environment using direct methods or using landmark features (such as oriented FAST and rotated BRIEF (ORB), scale-invariant feature transform (SIFT), speeded up robust features (SURF), etc.) extracted from the walkthrough video that is a sequence of frames. The path module 132 outputs a vector of six dimensional (6D) camera poses over time, with one 6D vector (three dimensions for location, three dimensions for orientation) for each frame in the sequence, and the 6D vector can be stored in the path storage 134.

The spatial indexing system 130 can also include floorplan storage 136, which stores one or more floorplans, such as those of environments captured by the video capture system 110. As referred to herein, a floorplan is a to-scale, two-dimensional (2D) diagrammatic representation of an environment (e.g., a portion of a building or structure) from a top-down perspective. In alternative embodiments, the floorplan may be a 3D model of the expected finished construction instead of a 2D diagram (e.g., building information modeling (BIM) model). The floorplan may be annotated to specify positions, dimensions, and types of physical objects that are expected to be in the environment. In some embodiments, the floorplan is manually annotated by a user associated with a client device 160 and provided to the spatial indexing system 130. In other embodiments, the floorplan is annotated by the spatial indexing system 130 using a machine learning model that is trained using a training dataset of annotated floorplans to identify the positions, the dimensions, and the object types of physical objects expected to be in the environment. Different portions of a building or structure may be represented by separate floorplans. For example, the spatial indexing system 130 may store separate floorplans for each floor of a building, unit, or substructure.

The model generation module 138 generates a 3D model of the environment. In some embodiments, the 3D model is based on image frames captured by the video capture system 110. To generate the 3D model of the environment based on image frames, the model generation module 138 may use methods such as structure from motion (SfM), simultaneous localization and mapping (SLAM), monocular depth map generation, or other methods. The 3D model may be generated using the image frames from the walkthrough video of the environment, the relative positions of each of the image frames (as indicated by the image frame's 6D pose), and (optionally) the absolute position of each of the image frames on a floorplan of the environment. The image frames from the video capture system 110 may be stereo images that can be combined to generate the 3D model. In some embodiments, the model generation module 138 generates a 3D point cloud based on the image frames using photogrammetry. In some embodiments, the model generation module 138 generates the 3D model based on LIDAR data from the system 150. The model generation module 138 may process the LIDAR data to generate a point cloud which may have a higher resolution compared to the 3D model generated with image frames. After generating the 3D model, the model generation module 138 stores the 3D model in the model storage 140.

In one embodiment, the model generation module 136 receives a frame sequence and its corresponding path (e.g., a 6D pose vector specifying a 6D pose for each frame in the walkthrough video that is a sequence of frames) from the path module 132 or the path storage 134 and extracts a subset of the image frames in the sequence and their corresponding 6D poses for inclusion in the 3D model. For example, if the walkthrough video that is a sequence of frames are frames in a video that was captured at 30 frames per second, the model generation module 136 subsamples the image frames by extracting frames and their corresponding 6D poses at 0.5-second intervals. An embodiment of the model generation module 136 is described in detail below with respect to FIG. 2B.

In the embodiment illustrated in FIG. 1, the 3D model is generated by the model generation module 138 in the spatial indexing system 130. However, in an alternative embodiment, the model generation module 138 may be generated by a third party application (e.g., an application installed on a mobile device that includes the video capture system 110 and/or the LIDAR system 150). The image frames captured by the video capture system 110 and/or LIDAR data collected by the LIDAR system 150 may be transmitted via the network 120 to a server associated with the application that processes the data to generate the 3D model. The spatial indexing system 130 may then access the generated 3D model and align the 3D model with other data associated with the environment to present the aligned representations to one or more users.

The model integration module 142 integrates the 3D model with other data that describe the environment. The other types of data may include one or more images (e.g., image frames from the video capture system 110), a 2D floorplan, a diagram, and annotations describing characteristics of the environment. The model integration module 142 determines similarities in the 3D model and the other data to align the other data with relevant portions of the 3D model. The model integration module 142 may determine which portion of the 3D model that the other data corresponds to and store an identifier associated with the determined portion of the 3D in association with the other data.

In some embodiments, the model integration module 142 may align the 3D model generated based on LIDAR data with one or more image frames based on time synchronization. As described above, the video capture system 110 and the LIDAR system 150 may be integrated into a single system that captures image frames and LIDAR data at the same time. For each image frame, the model integration module 142 may determine a timestamp at which the image frame was captured and identify a set of points in the LIDAR data associated with the same timestamp. The model integration module 142 may then determine which portion of the 3D model includes the identified set of points and align the image frame with the portion. Furthermore, the model integration module 142 may map pixels in the image frame to the set of points.

In some embodiments, the model integration module 142 may align a point cloud generated using LIDAR data (hereinafter referred to as "LIDAR point cloud") with another point cloud generated based on image frames (hereinafter referred to as "low-resolution point cloud"). This method may be used when the LIDAR system 150 and the video capture system 110 are separate systems. The model integration module 142 may generate a feature vector for each point in the LIDAR point cloud and each point in the low-resolution point cloud (e.g., using ORB, SIFT, Hard-NET). The model integration module 142 may determine feature distances between the feature vectors and match point pairs between the LIDAR point cloud and the low-resolution point cloud based on the feature distances. A 3D pose between the LIDAR point cloud and the low-resolution point cloud is determined to produce a greater number of geometric inliers for point pairs using, for example, random sample consensus (RANSAC) or non-linear optimization. Since the low-resolution point cloud is generated with image frames, the LIDAR point cloud is also aligned with the image frames themselves.

In some embodiments, the model integration module 142 may align the 3D model with a diagram or one or more image frames based on annotations associated with the diagram or the one or more image frames. The annotations may be provided by a user or determined by the spatial indexing system 130 using image recognition or machine learning models. The annotations may describe characteristics of objects or surfaces in the environment such as dimensions or object types. The model integration module 142 may extract features within the 3D model and compare the extracted features to annotations. For example, if the 3D model represents a room within a building, the extracted features from the 3D model may be used to determine the dimensions of the room. The determined dimensions may be compared to a floorplan of the construction site that is annotated with dimensions of various rooms within the building, and the model integration module 142 may identify a room within the floorplan that matches the determined dimensions. In some embodiments, the model integration module 142 may perform 3D object detection on the 3D model and compare outputs of the 3D object detection to outputs from the image recognition or machine learning models based on the diagram or the one or more images.

In some embodiments, the 3D model may be manually aligned with the diagram based on input from a user. The 3D model and the diagram may be presented to a client device 160 associated with the user, and the user may select a location within the diagram indicating a location corresponding to the 3D model. For example, the user may place a pin at a location in a floorplan that corresponds to the LIDAR data.

The interface module 144 provides a visualization interface to the client device 160 to present information associated with the environment. The interface module 144 may generate the visualization interface responsive to receiving a request from the client device 160 to view one or more models representing the environment. The interface module 144 may first generate the visualization interface to includes a 2D overhead map interface representing a floorplan of the environment from the floorplan storage 136. The 2D overhead map may be an interactive interface such that clicking on a point on the map navigates to the portion of the 3D model corresponding to the selected point in space. The visualization interface provides a first-person view of the portion of the 3D model that allows the user to pan and zoom around the 3D model and to navigate to other portions of the 3D model by selecting waypoint icons that represent the relative locations of the other portions.

The visualization interface also allows the user to select an object within the 3D model, which causes the visualization interface to display an image frame corresponding to the selected object. The user may select the object by interacting with a point on the object (e.g., clicking on a point on the object). When the interface module 144 detects the interaction from the user, the interface module 144 sends a signal to the query module 146 indicating the location of the point within the 3D model. The query module 146 identifies the image frame that is aligned with the selected point, and the interface module 144 updates the visualization interface to display the image frame. The visualization interface may include a first interface portion for displaying the 3D model and include a second interface portion for displaying the image frame. An example visualization interface is described with respect to FIGS. 3A-3D.

In some embodiments, the interface module 144 may receive a request to measure a distance between endpoints selected on the 3D model or the image frame. The interface module 144 may provide identities of the endpoints to the query module 146, and the query module 146 may determine (x,y,z) coordinates associated with the endpoints. The query module 146 may calculate a distance between the two coordinates and return the distance to the interface module 144. The interface module 144 may update the interface portion to display the requested distance to the user. Similarly, the interface module 144 may receive additional endpoints with a request to determine an area or volume of an object.

The client device 160 is any mobile computing device such as a smartphone, tablet computer, laptop computer or non-mobile computing device such as a desktop computer that can connect to the network 120 and be used to access the spatial indexing system 130. The client device 160 displays, on a display device such as a screen, the interface to a user and receives user inputs to allow the user to interact with the interface. An example implementation of the client device is described below with reference to the computer system 600 in FIG. 6.

III. Path Generation Overview

Figure 2A:
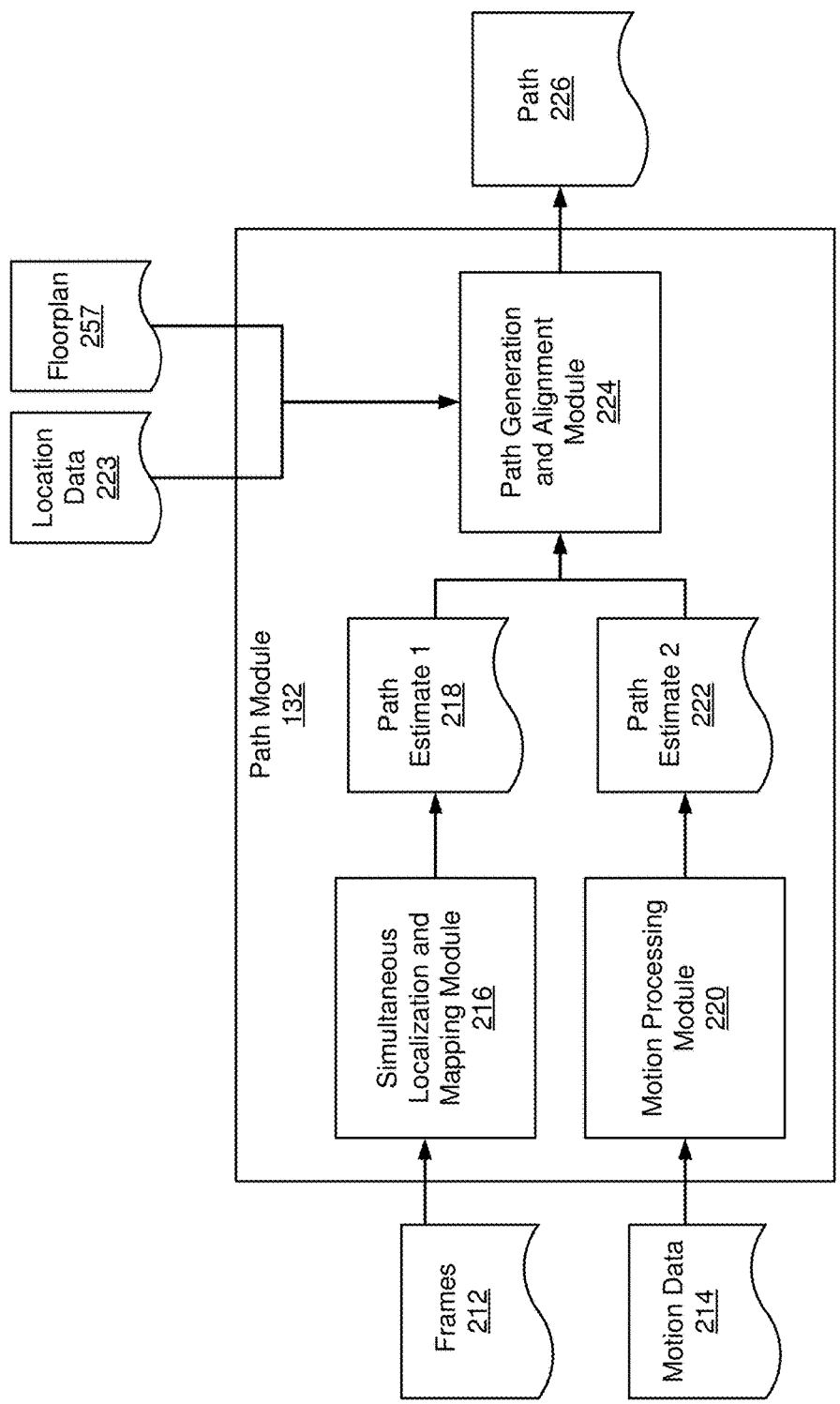
FIG. 2A illustrates a block diagram of a path module, according to one embodiment.

FIG. 2A illustrates a block diagram of the path module 132 of the spatial indexing system 130 shown in FIG. 1, according to one embodiment. The path module 132 receives input data (e.g., a sequence of frames 212, motion data 214, location data 223, floorplan 257) captured by the video capture system 110 and the LIDAR system 150 and generates a path 226. In the embodiment shown in FIG. 2A, the path module 132 includes a simultaneous localization and mapping (SLAM) module 216, a motion processing module 220, and a path generation and alignment module 224.

The SLAM module 216 receives the sequence of frames 212 and performs a SLAM algorithm to generate a first estimate 218 of the path. Before performing the SLAM algorithm, the SLAM module 216 can perform one or more preprocessing steps on the image frames 212. In one embodiment, the pre-processing steps include extracting features from the image frames 212 by converting the sequence of frames 212 into a sequence of vectors, where each vector is a feature representation of a respective frame. In particular, the SLAM module can extract SIFT features, SURF features, or ORB features.

After extracting the features, the pre-processing steps can also include a segmentation process. The segmentation process divides the walkthrough video that is a sequence of frames into segments based on the quality of the features in each of the image frames. In one embodiment, the feature quality in a frame is defined as the number of features that were extracted from the image frame. In this embodiment, the segmentation step classifies each frame as having high feature quality or low feature quality based on whether the feature quality of the image frame is above or below a threshold value, respectively (i.e., frames having a feature quality above the threshold are classified as high quality, and frames having a feature quality below the threshold are classified as low quality). Low feature quality can be caused by, e.g., excess motion blur or low lighting conditions.

After classifying the image frames, the segmentation process splits the sequence so that consecutive frames with high feature quality are joined into segments and frames with low feature quality are not included in any of the segments. For example, suppose the path travels into and out of a series of well-lit rooms along a poorly-lit hallway. In this example, the image frames captured in each room are likely to have high feature quality, while the image frames captured in the hallway are likely to have low feature quality. As a result, the segmentation process divides the walkthrough video that is a sequence of frames so that each sequence of consecutive frames captured in the same room is split into a single segment (resulting in a separate segment for each room), while the image frames captured in the hallway are not included in any of the segments.

After the pre-processing steps, the SLAM module 216 performs a SLAM algorithm to generate a first estimate 218 of the path. In one embodiment, the first estimate 218 is also a vector of 6D camera poses over time, with one 6D vector for each frame in the sequence. In an embodiment where the pre-processing steps include segmenting the walkthrough video that is a sequence of frames, the SLAM algorithm is performed separately on each of the segments to generate a path segment for each segment of frames.

The motion processing module 220 receives the motion data 214 that was collected as the video capture system 110 was moved along the path and generates a second estimate 222 of the path. Similar to the first estimate 218 of the path, the second estimate 222 can also be represented as a 6D vector of camera poses over time. In one embodiment, the motion data 214 includes acceleration and gyroscope data collected by an accelerometer and gyroscope, respectively, and the motion processing module 220 generates the second estimate 222 by performing a dead reckoning process on the motion data. In an embodiment where the motion data 214 also includes data from a magnetometer, the magnetometer data may be used in addition to or in place of the gyroscope data to determine changes to the orientation of the video capture system 110.

The data generated by many consumer-grade gyroscopes includes a time-varying bias (also referred to as drift) that can impact the accuracy of the second estimate 222 of the path if the bias is not corrected. In an embodiment where the motion data 214 includes all three types of data described above (accelerometer, gyroscope, and magnetometer data), and the motion processing module 220 can use the accelerometer and magnetometer data to detect and correct for this bias in the gyroscope data. In particular, the motion processing module 220 determines the direction of the gravity vector from the accelerometer data (which will typically point in the direction of gravity) and uses the gravity vector to estimate two dimensions of tilt of the video capture system 110. Meanwhile, the magnetometer data is used to estimate the heading bias of the gyroscope. Because magnetometer data can be noisy, particularly when used inside a building whose internal structure includes steel beams, the motion processing module 220 can compute and use a rolling average of the magnetometer data to estimate the heading bias. In various embodiments, the rolling average may be computed over a time window of 1 minute, 5 minutes, 10 minutes, or some other period.

The path generation and alignment module 224 combines the first estimate 218 and the second estimate 222 of the path into a combined estimate of the path 226. In an embodiment where the video capture system 110 also collects location data 223 while being moved along the path, the path generation module 224 can also use the location data 223 when generating the path 226. If a floorplan of the environment is available, the path generation and alignment module 224 can also receive the floorplan 257 as input and align the combined estimate of the path 216 to the floorplan 257.

IV. Model Generation Overview

Figure 2B:
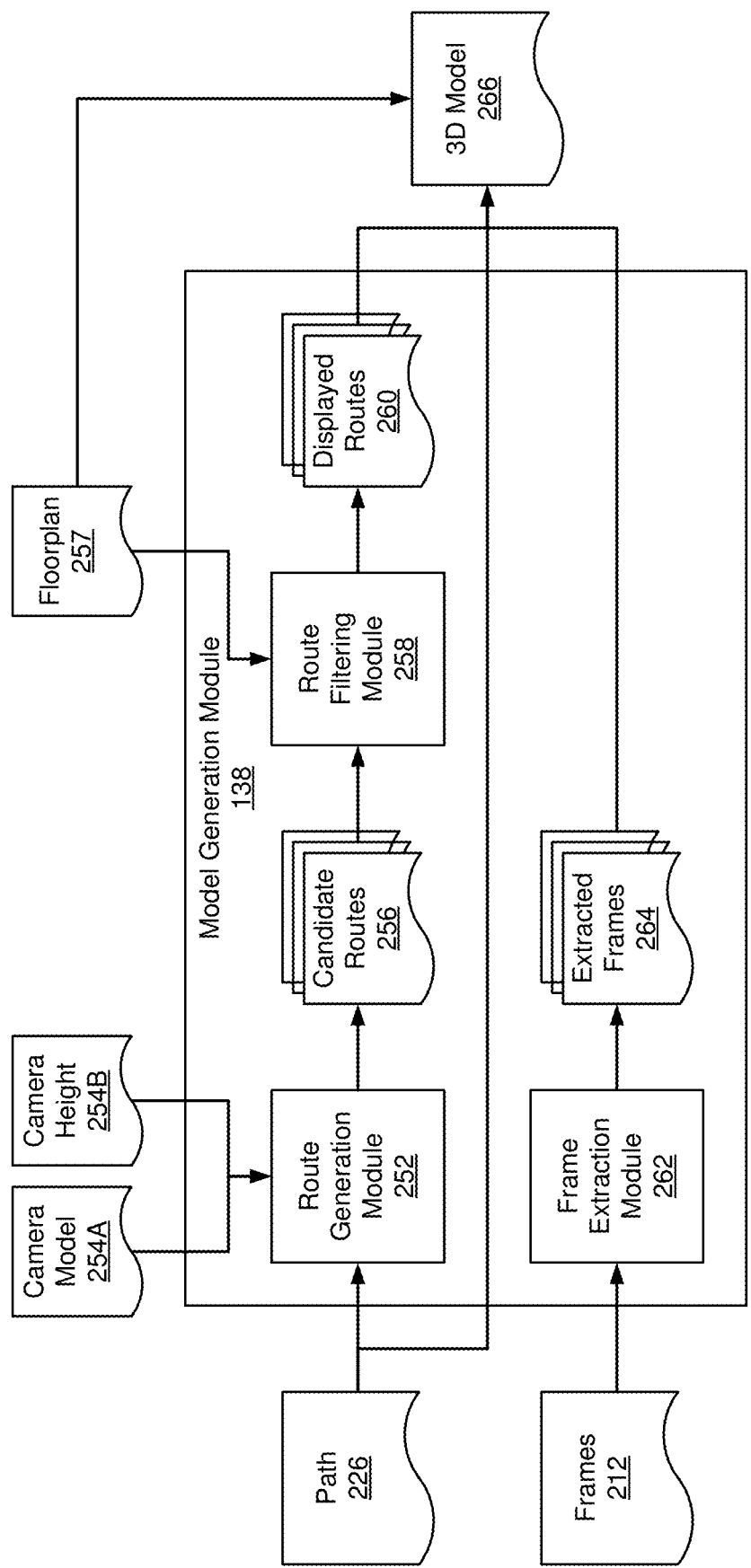
FIG. 2B illustrates a block diagram of a model generation module, according to one embodiment.

FIG. 2B illustrates a block diagram of the model generation module 138 of the spatial indexing system 130 shown in FIG. 1, according to one embodiment. FIG. 2B illustrates 3D model 266 generated based on image frames. The model generation module 138 receives the path 226 generated by the path module 132, along with the sequence of frames 212 that were captured by the video capture system 110, a floorplan 257 of the environment, and information about the camera 254. The output of the model generation module 138 is a 3D model 266 of the environment. In the illustrated embodiment, the model generation module 138 includes a route generation module 252, a route filtering module 258, and a frame extraction module 262.

The route generation module 252 receives the path 226 and camera information 254 and generates one or more candidate route vectors 256 for each extracted frame. The camera information 254 includes a camera model 254A and camera height 254B. The camera model 254A is a model that maps each 2D point in a frame (i.e., as defined by a pair of coordinates identifying a pixel within the image frame) to a 3D ray that represents the direction of the line of sight from the camera to that 2D point. In one embodiment, the spatial indexing system 130 stores a separate camera model for each type of camera supported by the system 130. The camera height 254B is the height of the camera relative to the floor of the environment while the walkthrough video that is a sequence of frames is being captured. In one embodiment, the camera height is assumed to have a constant value during the image frame capture process. For instance, if the camera is mounted on a hardhat that is worn on a user's body, then the height has a constant value equal to the sum of the user's height and the height of the camera relative to the top of the user's head (both quantities can be received as user input).

As referred to herein, a route vector for an extracted frame is a vector representing a spatial distance between the extracted frame and one of the other extracted frames. For instance, the route vector associated with an extracted frame has its tail at that extracted frame and its head at the other extracted frame, such that adding the route vector to the spatial location of its associated frame yields the spatial location of the other extracted frame. In one embodiment, the route vector is computed by performing vector subtraction to calculate a difference between the three-dimensional locations of the two extracted frames, as indicated by their respective 6D pose vectors.

Referring to the interface module 144, the route vectors for an extracted frame are later used after the interface module 144 receives the 3D model 266 and displays a first-person view of the extracted frame. When displaying the first-person view, the interface module 144 renders a waypoint icon (shown in FIG. 3B as a circle) at a position in the image frame that represents the position of the other frame (e.g., the image frame at the head of the route vector). In one embodiment, the interface module 144 uses the following equation to determine the position within the image frame at which to render the waypoint icon corresponding to a route vector:

$$P_{icon} = M_{proj} * (M_{view})^{-1} * M_{delta} * G_{ring}.$$

In this equation, $M_{proj}$ is a projection matrix containing the parameters of the camera projection function used for rendering, $M_{view}$ is an isometry matrix representing the user's position and orientation relative to his or her current frame, $M_{delta}$ is the route vector, $G_{ring}$ is the geometry (a list of 3D coordinates) representing a mesh model of the waypoint icon being rendered, and $P_{icon}$ is the geometry of the icon within the first-person view of the image frame.

Referring again to the route generation module 138, the route generation module 252 can compute a candidate route vector 256 between each pair of extracted frames. However, displaying a separate waypoint icon for each candidate route vector associated with an frame can result in a large number of waypoint icons (e.g., several dozen) being displayed in an frame, which can overwhelm the user and make it difficult to discern between individual waypoint icons.

To avoid displaying too many waypoint icons, the route filtering module 258 receives the candidate route vectors 256 and selects a subset of the route vectors to be displayed route vectors 260 that are represented in the first-person view with corresponding waypoint icons. The route filtering module 256 can select the displayed route vectors 256 based on a variety of criteria. For example, the candidate route vectors 256 can be filtered based on distance (e.g., only route vectors having a length less than a threshold length are selected).

In some embodiments, the route filtering module 256 also receives a floorplan 257 of the environment and also filters the candidate route vectors 256 based on features in the floorplan. In one embodiment, the route filtering module 256 uses the features in the floorplan to remove any candidate route vectors 256 that pass through a wall, which results in a set of displayed route vectors 260 that only point to positions that are visible in the image frame. This can be done, for example, by extracting an frame patch of the floorplan from the region of the floorplan surrounding a candidate route vector 256, and submitting the image frame patch to an frame classifier (e.g., a feed-forward, deep convolutional neural network) to determine whether a wall is present within the patch. If a wall is present within the patch, then the candidate route vector 256 passes through a wall and is not selected as one of the displayed route vectors 260. If a wall is not present, then the candidate route vector does not pass through a wall and may be selected as one of the displayed route vectors 260 subject to any other selection criteria (such as distance) that the module 258 accounts for.

The image frame extraction module 262 receives the sequence of 360-degree frames and extracts some or all of the image frames to generate extracted frames 264. In one embodiment, the sequences of 360-degree frames are captured as frames of a 360-degree walkthrough video, and the image frame extraction module 262 generates a separate extracted frame of each frame. As described above with respect to FIG. 1, the image frame extraction module 262 can also extract a subset of image frames from the walkthrough video. For example, if the walkthrough video that is a sequence of frames 212 was captured at a relatively high framerate (e.g., 30 or 60 frames per second), the image frame extraction module 262 can extract a subset of the image frames at regular intervals (e.g., two frames per second of video) so that a more manageable number of extracted frames 264 are displayed to the user as part of the 3D model.

The floorplan 257, displayed route vectors 260, path 226, and extracted frames 264 are combined into the 3D model 266. As noted above, the 3D model 266 is a representation of the environment that comprises a set of extracted frames 264 of the environment, the relative positions of each of the image frames (as indicated by the 6D poses in the path 226). In the embodiment shown in FIG. 2B, the 3D model also includes the floorplan 257, the absolute positions of each of the image frames on the floorplan, and displayed route vectors 260 for some or all of the extracted frames 264.

V. Model Visualization Interface

FIGS. 3A-3D illustrates examples of a model visualization interface 300 displaying a first interface portion 310 including a 3D model and a second interface portion 320 including an image aligned with the 3D model, according to one embodiment. The environment illustrated in FIGS. 3A-3D is a portion of a building (e.g., the back of the building). A user uses a mobile device to capture a video while walking around the building and to simultaneously collect LIDAR data. The video and the LIDAR data are provided to the spatial indexing system 130 that generates the 3D model based on the LIDAR data and aligns image frames in the video with corresponding portions of the 3D model. The interface module 144 of the spatial indexing system 130 generates the model visualization interface 300 to display the 3D model and the image frames.

The 3D model shown in the first interface portion 310 may be a point cloud generated based on LIDAR data. The 3D model is useful for visualizing the building in three dimensions, but it may be missing details or may have erroneous parts. Therefore, it is advantageous to display image frames that have high resolution 2D data alongside the 3D model to make up for deficiencies in the 3D model. The 3D model is aligned with the image frames, and when the first interface portion 310 display a portion of the 3D model, the second interface portion 320 displays an image frame that corresponds to the portion of the 3D model displayed in the first interface portion 310. As described above with respect to FIG. 2B, waypoint icons are associated with a path taken to capture the image frames and represent relative locations of the frames within the environment. Waypoint icons are provided in the 3D model to indicate locations at which one or more image frames were captured.

Figure 3A:
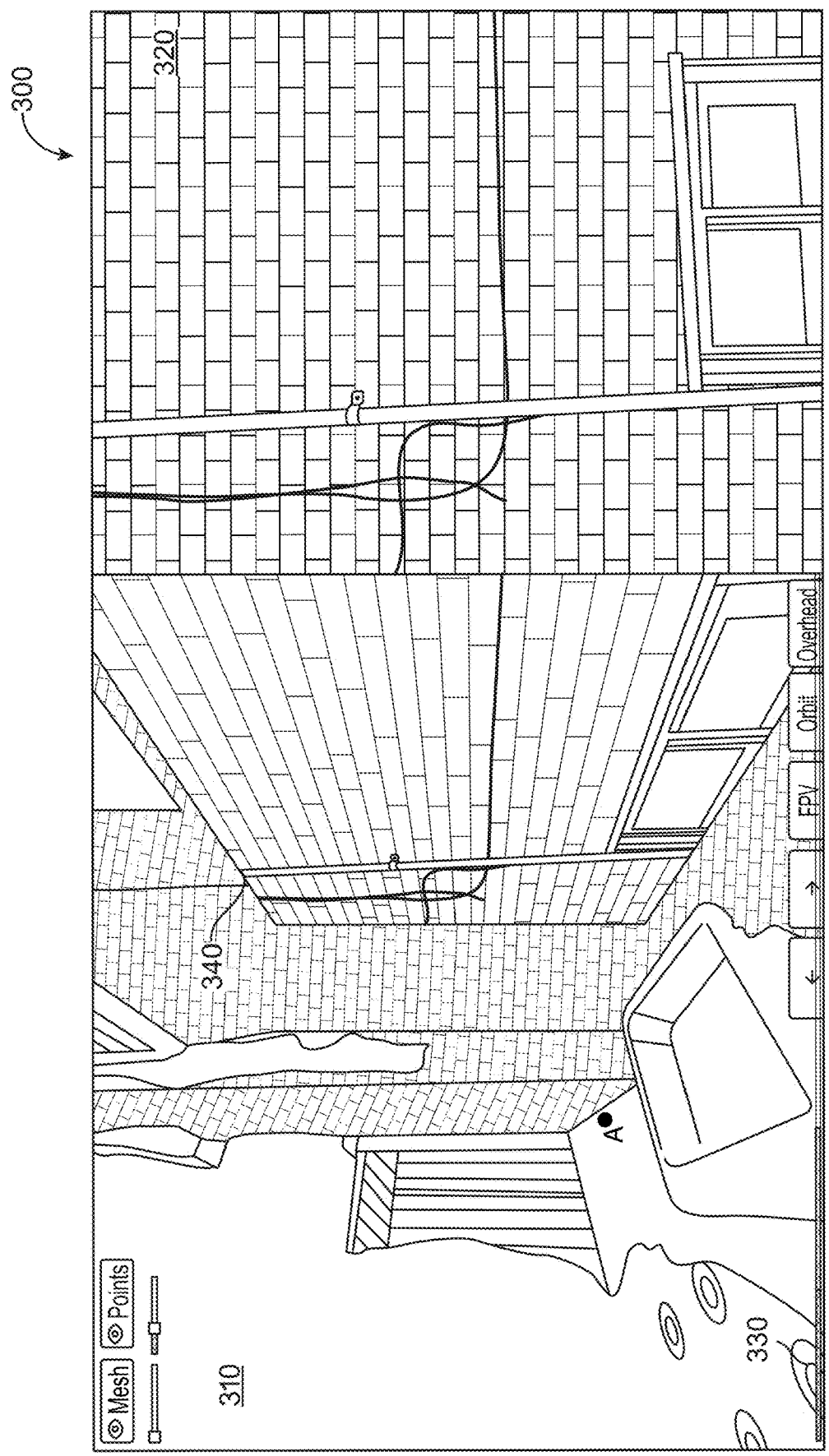
FIGS. 3A-3D illustrates examples of a model visualization interface displaying a first interface portion including a 3D model and a second interface portion including an image aligned with the 3D model, according to one embodiment.
Figure 3B:
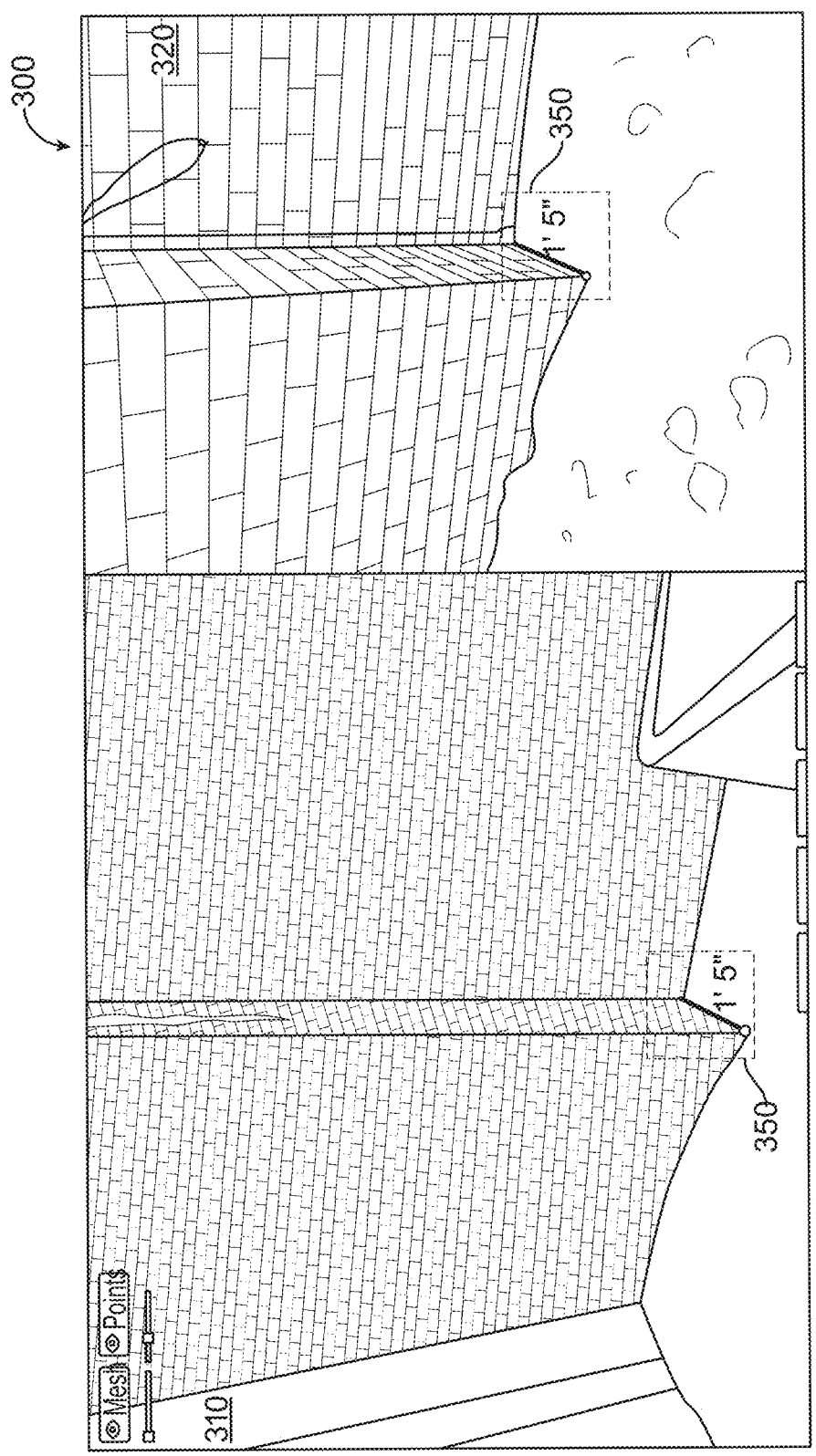

FIG. 3A illustrates the model visualization interface 300 that is presented responsive to the user interacting with a waypoint icon 330. The first interface portion 310 displays a first-person view of the portion of the 3D model that matches what the user would see if the user were to stand at a location in the actual environment corresponding to the first waypoint icon 330A. The first waypoint icon 330 is associated with a first image frame 340 that was captured at the location corresponding to the first point icon 330. The first image frame 340 is overlaid on the 3D model and at an angle perpendicular to an angle at which the first image frame 340 was captured. As described above, each image frame is associated with a 6D vector (3 dimensions for location, 3 dimensions for orientation), and the angle at which to tilt the first image 340 relative to the 3D model is determined based on the 3 dimensions for orientation in the 6D vector. The second interface portion 320 displays the same first image frame 340.

The interface module 144 receives an interaction with point A (e.g., click on point A) on the 3D model and updates the model visualization interface 300 to display a different portion of the 3D model. The interface module 144 may also update the model visualization interface 300 after receiving other types of interactions within the 3D model that represent requests to view different portions of the 3D model and image frames by zooming in and out, rotating, and shifting. When the first interface portion 310 is updated to display the different portion of the 3D model, the second interface portion 320 is simultaneously updated to display the image frame corresponding to the different portion of the 3D model.

In some embodiments, the model visualization interface 300 may include a measurement tool that can be used to measure dimensions of an object or surface of interest. The measurement tool allows user to determine accurate dimensions from the 3D model without having to revisit the building in person. The interface module 144 may receive two endpoints of a dimension of interest from the user and determine a distance 350 between the endpoints. In the example shown in FIG. 3B, the measurement tool is used to measure how much a portion of the wall extends outward. Because the 3D model in the first interface portion 310 and the image frame in the second interface portion 320 are aligned, the endpoints may be selected from either interface portion. To determine the distance, the interface module 144 may provide identities of the endpoints selected by the user to the query module 146 that retrieves (x,y,z) coordinates of the endpoints. The query module 146 may compute the distance 350 between the coordinates and provide the distance 350 to the interface module 144 that displays it within at least one of the first interface portion 310 and the second interface portion 320.

Figure 3C:
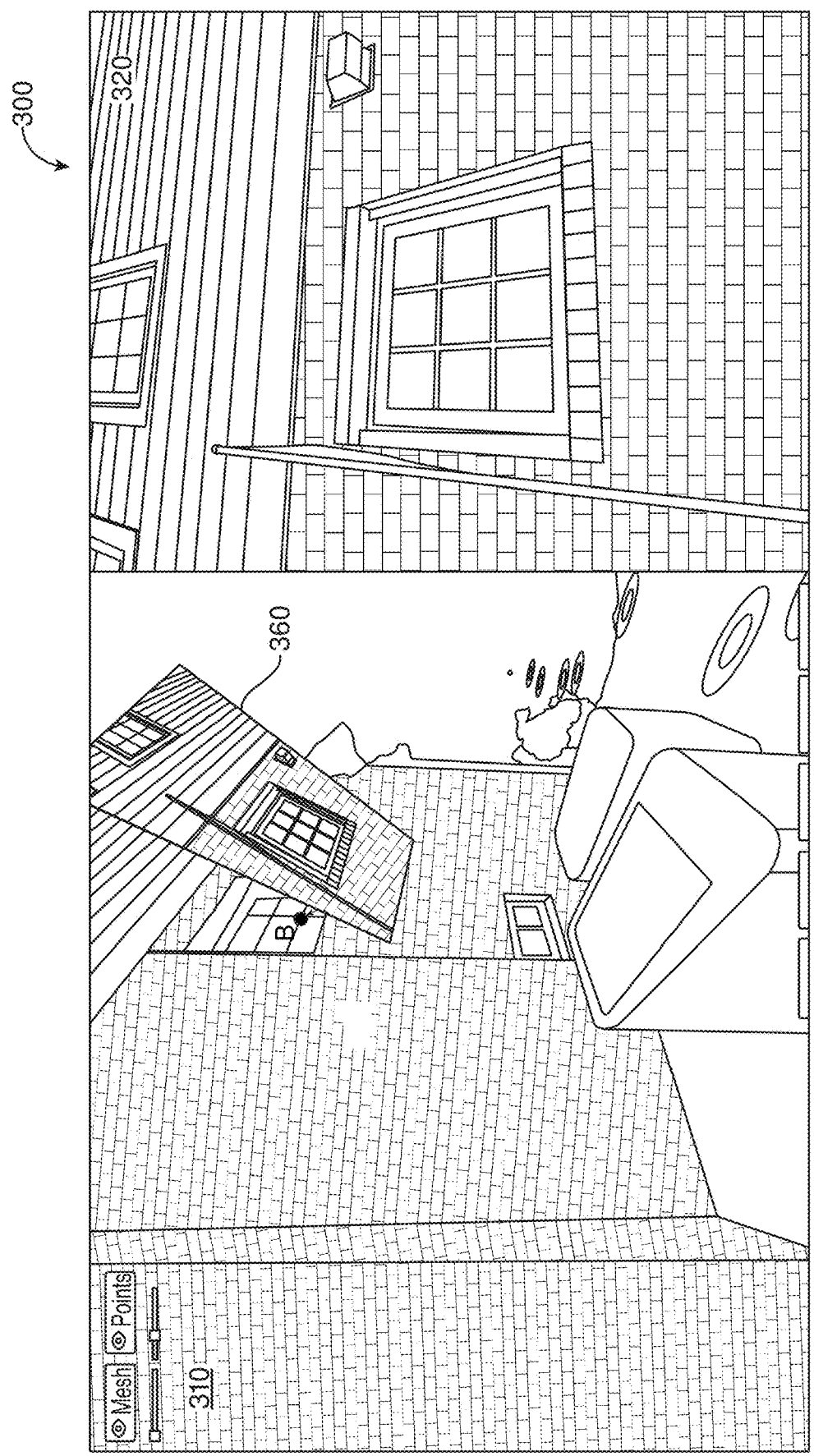
Figure 3D:
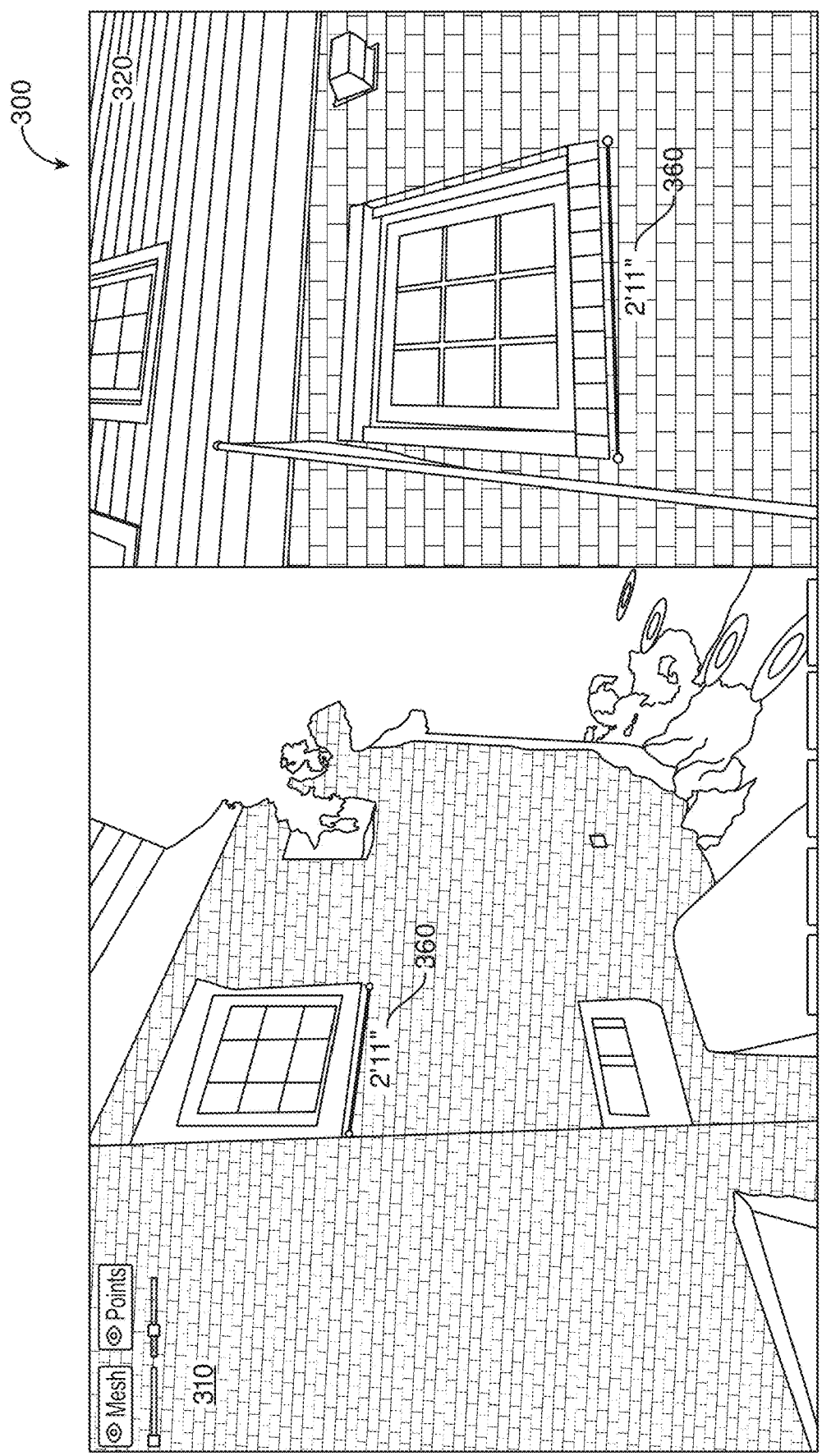

FIG. 3C illustrates another view of the 3D model and a second image frame 360 associated with location B. The interface module 144 may receive an interaction with location B and update the model visualization interface 300 as shown in FIG. 3C. For example, the user may wish to view details of a window at location B and click on location B. Responsive to receiving the interaction, the first interface portion 310 is overlaid with the second image frame 360 that is placed at an angle that is perpendicular to an angle of capture for the second image frame 360 (e.g., tilted downward toward the ground). The second interface portion 320 is also updated to display the second image frame 360. The interface module 144 may receive a request for a measurement including endpoints corresponding to a width of the window. As illustrated in FIG. 3D, the first interface portion 310 and the second interface portion 320 is updated to include a distance 360 between the endpoints.

In the example illustrated in FIGS. 3A-3D, a split screen mode of the model visualization interface 300 with the first interface portion 310 and the second interface portion 320 is illustrated to show the 3D model and image frames at the same time. However, the model visualization interface 300 be presented in other viewing modes. For example, model visualization interface 300 may initially show one of the first interface portion 310 and the second interface portion 320, and change into the split screen mode responsive to receiving a request from a user to display both. In another example, the user interface may initially display a floorplan of an area that includes one or more graphical elements at locations in the floorplan where a 3D model or an image frame is available. Responsive to receiving an interaction with a graphical element, the user interface may be updated to display the 3D model or the image frame.

In other embodiments, a different pair of models may be displayed in the model visualization interface 300. That is, instead of a LIDAR data-based 3D model and image frames, one of the models may be replaced with a diagram, another 3D model (e.g., BIM model, image based 3D model), or other representations of the building.

VI. Spatial Indexing of Frames Based on Floorplan Features

As noted above, the visualization interface can provide a 2D overhead view map that displays the location of each frame within a floorplan of the environment. In addition to being displayed in the overhead view, the floorplan of the environment can also be used as part of the spatial indexing process that determines the location of each frame.

Figure 4:
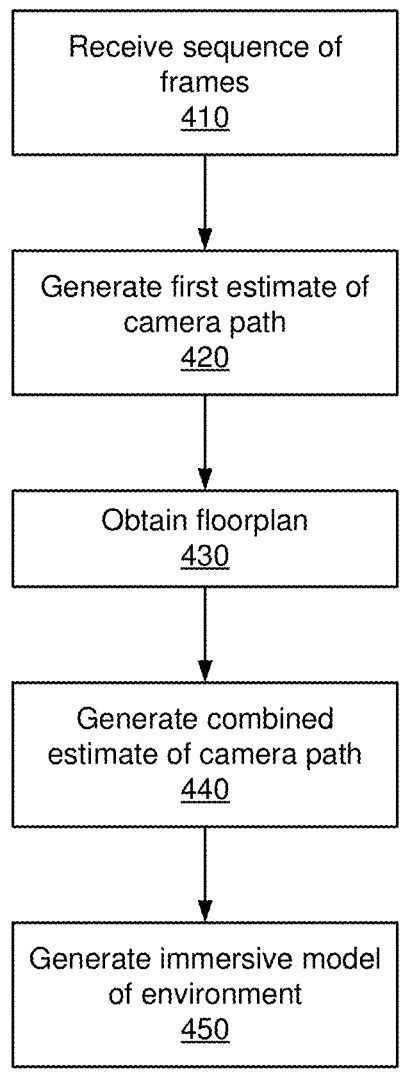
FIG. 4 is a flow chart illustrating an example method for automated spatial indexing of frames using features in a floorplan, according to one embodiment.

FIG. 4 is a flow chart illustrating an example method 400 for automated spatial indexing of frames using features in a floorplan, according to one embodiment. In other embodiments, the method 400 may include additional, fewer, or different steps, and the steps shown in FIG. 4 may be performed in a different order. For instance, the method 400 may be performed without obtaining 430 a floorplan, in which case the combined estimate of the path is generated 440 without using features in the floorplan.

The spatial indexing system 130 receives 410 a walkthrough video that is a sequence of frames from a video capture system 110. The image frames in the sequence are captured as the video capture system 110 is moved through an environment (e.g., a floor of a construction site) along a path. In one embodiment, each of the image frames is a frame that is captured by a camera on the video capture system (e.g., the camera 112 described above with respect to FIG. 1). In another embodiment, each of the image frames has a narrower field of view, such as 90 degrees.

The spatial indexing system 130 generates 420 a first estimate of the path based on the walkthrough video that is a sequence of frames. The first estimate of the path can be represented, for example, as a six-dimensional vector that specifies a 6D camera pose for each frame in the sequence. In one embodiment, a component of the spatial indexing system 130 (e.g., the SLAM module 216 described above with reference to FIG. 2A) performs a SLAM algorithm on the walkthrough video that is a sequence of frames to simultaneously determine a 6D camera pose for each frame and generate a three-dimensional virtual model of the environment.

The spatial indexing system 130 obtains 430 a floorplan of the environment. For example, multiple floorplans (including the floorplan for the environment that is depicted in the received walkthrough video that is a sequence of frames) may be stored in the floorplan storage 136, and the spatial indexing system 130 accesses the floorplan storage 136 to obtain the floorplan of the environment. The floorplan of the environment may also be received from a user via the video capture system 110 or a client device 160 without being stored in the floorplan storage 136.

The spatial indexing system 130 generates 440 a combined estimate of the path based on the first estimate of the path and the physical objects in the floorplan. After generating 440 the combined estimate of the path, the spatial indexing system 130 generates 450 a 3D model of the environment. For example, the model generation module 138 generates the 3D model by combining the floorplan, a plurality of route vectors, the combined estimate of the path, and extracted frames from the walkthrough video that is a sequence of frames, as described above with respect to FIG. 2B.

In some embodiments, the spatial indexing system 130 may also receive additional data (apart from the walkthrough video that is a sequence of frames) that was captured while the video capture system is being moved along the path. For example, the spatial indexing system also receives motion data or location data as described above with reference to FIG. 1. In embodiments where the spatial indexing system 130 receives additional data, the spatial indexing system 130 may use the additional data in addition with the floorplan when generating 440 the combined estimate of the path.

In an embodiment where the spatial indexing system 130 receives motion data along with the walkthrough video that is a sequence of frames, the spatial indexing system 130 can perform a dead reckoning process on the motion data to generate a second estimate of the path, as described above with respect to FIG. 2A. In this embodiment, the step of generating 440 the combined estimate of the path includes using portions of the second estimate to fill in gaps in the first estimate of the path. For example, the first estimate of the path may be divided into path segments due to poor feature quality in some of the captured frames (which causes gaps where the SLAM algorithm cannot generate a reliable 6D pose, as described above with respect to FIG. 2A). In this case, 6D poses from the second path estimate can be used to join the segments of the first path estimate by filling in the gaps between the segments of the first path estimate.

As noted above, in some embodiments the method 400 may be performed without obtaining 430 a floorplan and the combined estimate of the path is generated 440 without using features in the floorplan. In one of these embodiments, the first estimate of the path is used as the combined estimate of the path without any additional data processing or analysis.

In another one of these embodiments, the combined estimate of the path is generated 440 by generating one or more additional estimates of the path, calculating a confidence score for each 6D pose in each path estimate, and selecting, for each spatial position along the path, the 6D pose with the highest confidence score. For instance, the additional estimates of the path may include one or more of: a second estimate using motion data, as described above, a third estimate using data from a GPS receiver, and a fourth estimate using data from an IPS receiver. As described above, each estimate of the path is a vector of 6D poses that describe the relative position and orientation for each frame in the sequence.

The confidence scores for the 6D poses are calculated differently for each path estimate. For instance, confidence scores for the path estimates described above may be calculated in the following ways: a confidence score for a 6D pose in the first estimate (generated with a SLAM algorithm) represents the feature quality of the image frame corresponding to the 6D pose (e.g., the number of detected features in the image frame); a confidence score for a 6D pose in the second estimate (generated with motion data) represents a level of noise in the accelerometer, gyroscope, and/or magnetometer data in a time interval centered on, preceding, or subsequent to the time of the 6D pose; a confidence score for a 6D pose in the third estimate (generated with GPS data) represents GPS signal strength for the GPS data used to generate the 6D pose; and a confidence score for a 6D pose in the fourth estimate (generated with IPS data) represents IPS signal strength for the IPS data used to generate the 6D pose (e.g., RF signal strength).

After generating the confidence scores, the spatial indexing system 130 iteratively scans through each estimate of the path and selects, for each frame in the sequence, the 6D pose having the highest confidence score, and the selected 6D pose is output as the 6D pose for the image frame in the combined estimate of the path. Because the confidence scores for each path estimate are calculated differently, the confidence scores for each path estimate can be normalized to a common scale (e.g., a scalar value between 0 and 1, with 0 representing the lowest possible confidence and 1 representing the highest possible confidence) before the iterative scanning process takes place.

VII. Interface Generation Overview

Figure 5:
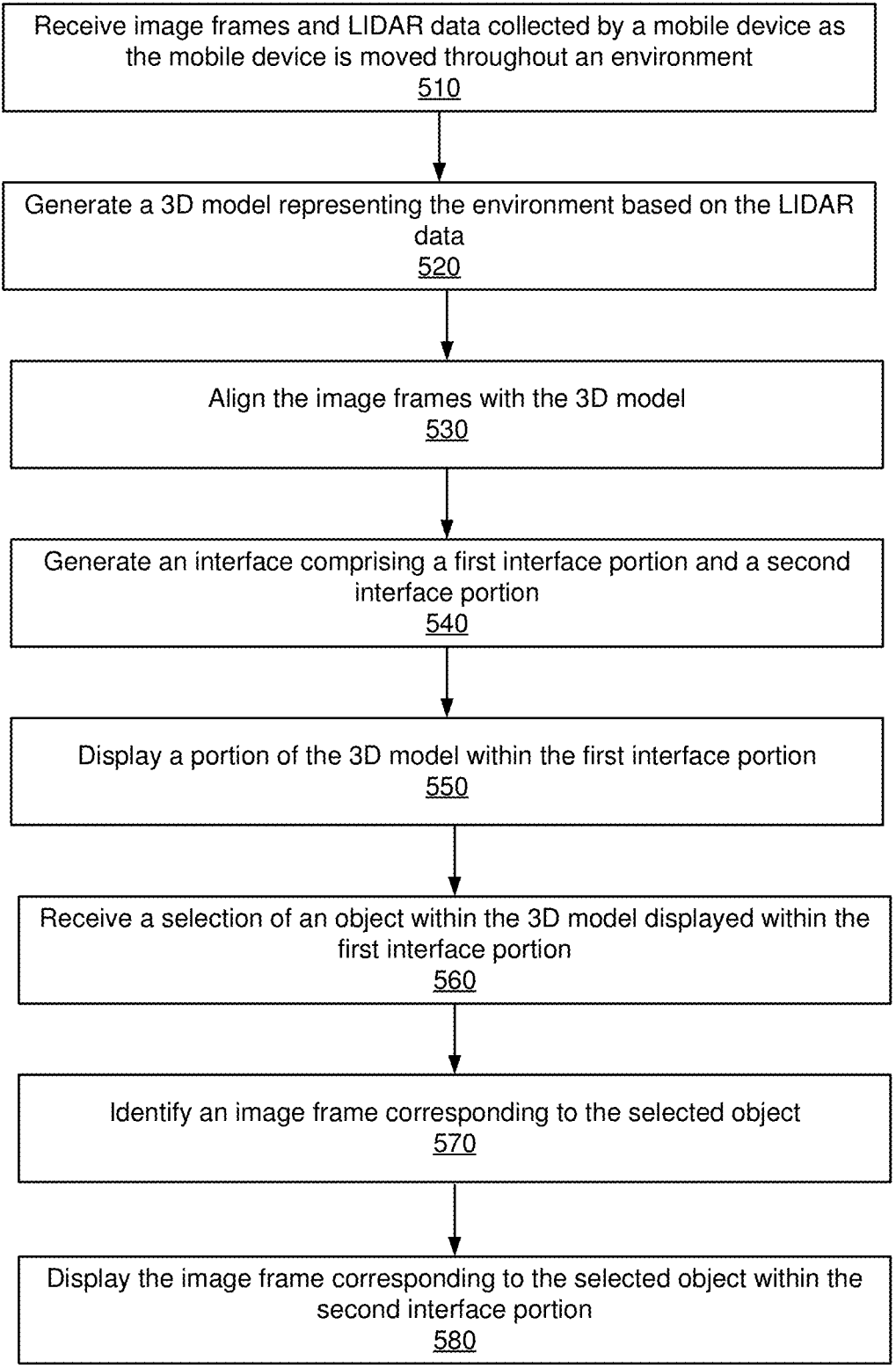
FIG. 5 is a flow chart illustrating an example method for generating an interface displaying a 3D model aligned with image frames, according to one embodiment.

FIG. 5 is a flow chart 500 illustrating an example method for generating an interface displaying a 3D model aligned with image frames, according to one embodiment. The spatial indexing system receives 510 image frames and LIDAR data collected by a mobile device as the mobile device is moved throughout an environment. Based on the LIDAR data, the spatial indexing system generates 520 a 3D model representing the environment. The spatial indexing system aligns 530 the image frames with the 3D model. The spatial indexing system generates 540 an interface comprising a first interface portion and a second interface portion. The spatial indexing system displays 550 a portion of the 3D model within the first interface portion. The spatial indexing system receives 560 a selection of an object within the 3D model displayed within the first interface portion. The spatial indexing system identifies 570 an image frame corresponding to the selected object. The spatial indexing system displays 580 the image frame corresponding to the selected object within the second interface portion.

VIII. Hardware Components

Figure 6:
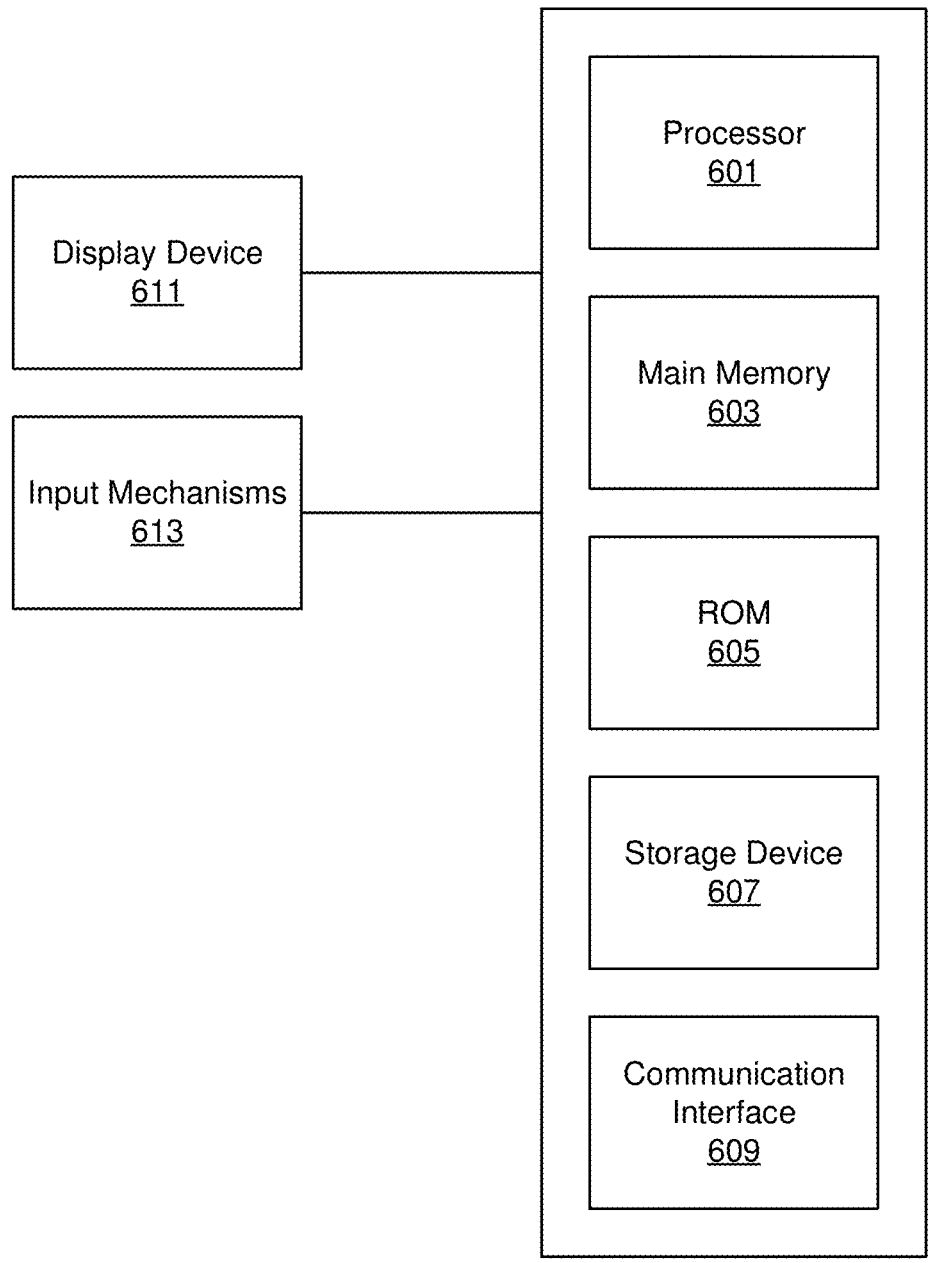
FIG. 6 is a diagram illustrating a computer system that implements the embodiments herein, according to one embodiment.

FIG. 6 is a block diagram illustrating a computer system 600 upon which embodiments described herein may be implemented. For example, in the context of FIG. 1, the video capture system 110, the LIDAR system 150, the spatial indexing system 130, or the client device 160 may be implemented using the computer system 600 as described in FIG. 6. The video capture system 110, the LIDAR system 150, the spatial indexing system 130, or the client device 160 may also be implemented using a combination of multiple computer systems 600 as described in FIG. 6. The computer system 600 may be, for example, a laptop computer, a desktop computer, a tablet computer, or a smartphone.

In one implementation, the system 600 includes processing resources 601, main memory 603, read only memory (ROM) 605, storage device 607, and a communication interface 609. The system 600 includes at least one processor 601 for processing information and a main memory 603, such as a random access memory (RAM) or other dynamic storage device, for storing information and instructions to be executed by the processor 601. Main memory 603 also may be used for storing temporary variables or other intermediate information during execution of instructions to be executed by processor 601. The system 600 may also include ROM 605 or other static storage device for storing static information and instructions for processor 601. The storage device 607, such as a magnetic disk or optical disk, is provided for storing information and instructions.

The communication interface 609 can enable system 600 to communicate with one or more networks (e.g., the network 140) through use of the network link (wireless or wireline). Using the network link, the system 600 can communicate with one or more computing devices, and one or more servers. The system 600 can also include a display device 611, such as a cathode ray tube (CRT), an LCD monitor, or a television set, for example, for displaying graphics and information to a user. An input mechanism 613, such as a keyboard that includes alphanumeric keys and other keys, can be coupled to the system 600 for communicating information and command selections to processor 601. Other non-limiting, illustrative examples of input mechanisms 613 include a mouse, a trackball, touch-sensitive screen, or cursor direction keys for communicating direction information and command selections to processor 601 and for controlling cursor movement on display device 611. Additional examples of input mechanisms 613 include a radio-frequency identification (RFID) reader, a barcode reader, a three-dimensional scanner, and a three-dimensional camera.

According to one embodiment, the techniques described herein are performed by the system 600 in response to processor 601 executing one or more sequences of one or more instructions contained in main memory 603. Such instructions may be read into main memory 603 from another machine-readable medium, such as storage device 607. Execution of the sequences of instructions contained in main memory 603 causes processor 601 to perform the process steps described herein. In alternative implementations, hard-wired circuitry may be used in place of or in combination with software instructions to implement examples described herein. Thus, the examples described are not limited to any specific combination of hardware circuitry and software.

IX. Additional Considerations

As used herein, the term "includes" followed by one or more elements does not exclude the presence of one or more additional elements. The term "or" should be construed as a non-exclusive "or" (e.g., "A or B" may refer to "A," "B," or "A and B") rather than an exclusive "or." The articles "a" or "an" refer to one or more instances of the following element unless a single instance is clearly specified.

The drawings and written description describe example embodiments of the present disclosure and should not be construed as enumerating essential features of the present disclosure. The scope of the invention should be construed from any claims issuing in a patent containing this description.

What is claimed is:

1. A method comprising:
receiving image frames and light detection and ranging (LIDAR) data collected by a mobile device as the mobile device is moved through an environment;
generating a 3D model representing the environment based on the LIDAR data;
aligning the image frames with the 3D model;
generating an interface comprising a first interface portion and a second interface portion;
displaying a portion of the 3D model within the first interface portion;
receiving a selection of an object within the 3D model displayed within the first interface portion;
identifying an image frame corresponding to the selected object;
displaying the image frame corresponding to the selected object within the second interface portion; and
modifying the first interface portion to include a representation of an angle of capture of the image frame by the mobile device within the 3D model at a location corresponding to the selected object.

2. The method of claim 1, further comprising:
modifying the first interface portion to include the image frame overlaid onto the 3D model at the location corresponding to the selected object.

3. The method of claim 2, wherein the image frame is rendered within the 3D model at an angle perpendicular to the angle of capture of the image frame by the mobile device.

4. The method of claim 1, further comprising:
receiving a selection of two endpoints of the object within 3D model displayed within the first interface portion;
determining a distance between the two endpoints; and
displaying the determined distance within the first interface portion.

5. The method of claim 1, further comprising:
receiving a selection of two endpoints of the object within the image frame within the second interface portion;
determining a distance between the two endpoints; and
displaying the determined distance within the second interface portion.

6. The method of claim 1, wherein the three dimensional (3D) model is generated by performing a simultaneous localization and mapping process on the LIDAR data.

7. The method of claim 1, wherein aligning the image frames with the 3D model further comprises:
determining a first set of features vectors associated with a plurality of points in the 3D model generated based on the LIDAR data;
generating a second 3D model representing the environment based on the image frames;
determining a second set of feature vectors associated with a plurality of points in the second 3D model generated based on the image frames; and
mapping the plurality of points in the 3D model to the plurality of points in the second 3D model based on the first set of feature vectors and the second set of feature vectors.

8. The method of claim 1, wherein aligning the image frames with the 3D model further comprises:
for each image frame:
determining a period of time associated with the image frame;
identifying a portion of the LIDAR data associated with the period of time, the portion of the LIDAR data associated with a portion of the 3D model; and
storing an identification of the image frame in association with the identified portion of LIDAR data.

9. The method of claim 1, wherein aligning the image frames with the 3D model further comprises:
extracting features associated with the 3D model;
comparing extracted features to annotations associated with one or more image frames; and
based on the comparison, storing an identification of an image frame in association with a portion of the 3D model, wherein one or more annotations associated with the image frame matches one or more features of the portion of the 3D model.

10. The method of claim 1, further comprising:
receiving an interaction with the first interface portion;
updating the first interface portion to display a different portion of the 3D model according to the interaction; and
updating the second interface portion to display a different image frame according to the interaction.

11. The method of claim 10, wherein the first interface portion and the second interface portion are updated simultaneously.

12. The method of claim 10, wherein the interaction includes at least one of zooming in, zooming out, rotating, and shifting.

13. A non-transitory computer-readable storage medium storing executable instructions that, when executed by a hardware processor, cause the hardware processor to perform steps comprising:
receiving image frames and light detection and ranging (LIDAR) data collected by a mobile device as the mobile device is moved through an environment;
generating a 3D model representing the environment based on the LIDAR data;
aligning the image frames with the 3D model;
generating an interface comprising a first interface portion and a second interface portion;
displaying a portion of the 3D model within the first interface portion;
receiving a selection of an object within the 3D model displayed within the first interface portion;
identifying an image frame corresponding to the selected object;
displaying the image frame corresponding to the selected object within the second interface portion; and
modifying the first interface portion to include a representation of an angle of capture of the image frame by the mobile device within the 3D model at a location corresponding to the selected object.

14. The non-transitory computer-readable storage medium of claim 13 further storing executable instructions that, when executed by the hardware processor, further cause the hardware processor to perform:
modifying the first interface portion to include the image frame overlaid onto the 3D model at the location corresponding to the selected object.

15. The non-transitory computer-readable storage medium of claim 14, wherein the image frame is rendered within the 3D model at an angle perpendicular to the angle of capture of the image frame by the mobile device.

16. The non-transitory computer-readable storage medium of claim 13 further storing executable instructions that, when executed by the hardware processor, further cause the hardware processor to perform:
receiving a selection of two endpoints of the object within 3D model displayed within the first interface portion;
determining a distance between the two endpoints; and
displaying the determined distance within the first interface portion.

17. The non-transitory computer-readable storage medium of claim 13 further storing executable instructions that, when executed by the hardware processor, further cause the hardware processor to perform:
receiving a selection of two endpoints of the object within the image frame within the second interface portion;
determining a distance between the two endpoints; and
displaying the determined distance within the second interface portion.

18. The non-transitory computer-readable storage medium of claim 13, wherein the three dimensional (3D) model is generated by performing a simultaneous localization and mapping process on the LIDAR data.

19. A system comprising:
a processor; and
a non-transitory computer readable storage medium comprising computer program instructions that when executed by the processor, cause the processor to:

receive image frames and light detection and ranging (LIDAR) data collected by a mobile device as the mobile device is moved through an environment;
generate a 3D model representing the environment based on the LIDAR data;
align the image frames with the 3D model;
generate an interface comprising a first interface portion and a second interface portion;
display a portion of the 3D model within the first interface portion;
receive a selection of an object within the 3D model displayed within the first interface portion;
identify an image frame corresponding to the selected object;
display the image frame corresponding to the selected object within the second interface portion; and
modify the first interface portion to include a representation of an angle of capture of the image frame by the mobile device within the 3D model at a location corresponding to the selected object.

20. The system of claim 19, wherein the computer program instructions cause the processor to modify the first interface portion to include the image frame overlaid onto the 3D model at the location corresponding to the selected object.

* * * * *